(12) United States Patent
Futral et al.

(10) Patent No.: US 10,029,245 B2
(45) Date of Patent: Jul. 24, 2018

(54) METHODS, SYSTEMS, AND APPARATUSES TO IMPROVE PROCESSES OF INCREASING FISCHER-TROPSCH CATALYST ACTIVITY

(71) Applicant: SGCE LLC, Pasadena, TX (US)

(72) Inventors: Gary Stephen Futral, Houston, TX (US); Govindarajan Raman, Sugar Land, TX (US)

(73) Assignee: SGCE LLC, Pasadena, TX (US)

( * ) Notice: Subject to any disclaimer, the term of this patent is extended or adjusted under 35 U.S.C. 154(b) by 0 days.

(21) Appl. No.: 15/315,132

(22) PCT Filed: Jun. 4, 2015

(86) PCT No.: PCT/US2015/034216
§ 371 (c)(1),
(2) Date: Nov. 30, 2016

(87) PCT Pub. No.: WO2015/187962
PCT Pub. Date: Dec. 10, 2015

(65) Prior Publication Data
US 2017/0113214 A1    Apr. 27, 2017

Related U.S. Application Data

(60) Provisional application No. 62/008,301, filed on Jun. 5, 2014.

(51) Int. Cl.
| | |
|---|---|
| *B01J 38/04* | (2006.01) |
| *B01J 8/06* | (2006.01) |
| *B01J 37/16* | (2006.01) |
| *C10G 2/00* | (2006.01) |
| *B01J 37/08* | (2006.01) |

(Continued)

(52) U.S. Cl.
CPC .............. *B01J 38/04* (2013.01); *B01J 8/067* (2013.01); *B01J 23/94* (2013.01); *B01J 37/08* (2013.01); *B01J 37/16* (2013.01); *C10G 2/32* (2013.01); *C10G 2/341* (2013.01); *B01J 38/02* (2013.01); *B01J 2208/00212* (2013.01); *B01J 2208/00256* (2013.01); *B01J 2208/00539* (2013.01);

(Continued)

(58) Field of Classification Search
CPC . B01J 38/04; B01J 8/067; B01J 23/94; C10G 2/32
USPC ......................................................... 502/34
See application file for complete search history.

(56) References Cited

U.S. PATENT DOCUMENTS

| | | | |
|---|---|---|---|
| 2005/0163680 A1* | 7/2005 | Le ............................. | B01J 8/067 422/198 |
| 2007/0299148 A1* | 12/2007 | Verbist ..................... | B01J 8/067 518/712 |

(Continued)

*Primary Examiner* — Edward Johnson
(74) *Attorney, Agent, or Firm* — Timothy S. Westby; Porter Hedges LLP; Danita Maseles

(57) ABSTRACT

One or more embodiments of the present disclosure include methods of improving the activity of an at least partially non-active Fischer-Tropsch ("FT") catalyst in a tubular FT reactor, which includes heating a heat transfer fluid ("HTF") to a vapor state, using the heated HTF in the vapor state to achieve and maintain the at least partially non-active FT catalyst at a predetermined stage temperature; and exposing the at least partially non-active FT catalyst to at least one stage FT catalyst activity-related gas for a stage duration of time to increase the activity of the FT catalyst to a desired level. Other methods, systems and apparatuses are also disclosed.

47 Claims, 7 Drawing Sheets

(51) Int. Cl.
*B01J 23/94* (2006.01)
*B01J 38/02* (2006.01)
(52) U.S. Cl.
CPC ............... *B01J 2219/00204* (2013.01); *B01J 2219/00211* (2013.01); *B01J 2219/00238* (2013.01)

(56) References Cited

U.S. PATENT DOCUMENTS

| | | |
|---|---|---|
| 2008/0210596 A1* | 9/2008 | Litt ................... B01J 19/0093 208/20 |
| 2011/0213186 A1* | 9/2011 | Di Girolamo ........... B01J 8/003 568/689 |
| 2011/0245355 A1* | 10/2011 | Van De Loosdrecht ............. B01J 23/94 518/709 |

* cited by examiner

METHODS, SYSTEMS, AND APPARATUSES TO IMPROVE PROCESSES OF INCREASING FISCHER-TROPSCH CATALYST ACTIVITY

STATEMENT REGARDING FEDERALLY SPONSORED RESEARCH OR DEVELOPMENT

Not applicable.

RELATED APPLICATIONS

Not applicable.

BACKGROUND

Field of the Invention

The present invention relates to systems, methods and apparatuses for Fischer-Tropsch gas to liquid hydrocarbon production. Specifically, the present invention relates to systems, methods and apparatuses for establishing catalyst activation and/or regeneration in a Fischer-Tropsch system.

Background of the Invention

The Fischer-Tropsch (or "Fischer Tropsch," "F-T" or "FT") process (or synthesis or conversion) involves a set of chemical reactions that convert a mixture of carbon monoxide and hydrogen (known as reformed gas, synthesis gas, or "syngas") into liquid hydrocarbons (called "liquid FT hydrocarbons" herein). The liquid FT hydrocarbons may include a wax ("FT wax") that may be liquid when produced but becomes solid as it cools. The process was first developed by German chemists Franz Fischer and Hans Tropsch in the 1920's. The FT conversion is a catalytic and exothermic process. The FT process is utilized to produce petroleum substitutes, typically from carbon-containing energy sources such as coal, natural gas, biomass, or carbonaceous waste streams (such as municipal solid waste) that are suitable for use as synthetic fuels, waxes and/or lubrication oils. The carbon-containing energy source is first converted into a reformed gas, using a syngas preparation unit in a syngas conversion. Depending on the physical form of the carbon-containing energy source, syngas preparation may involve technologies such as steam methane reforming, gasification, carbon monoxide shift conversion, acid gas removal, gas cleaning and conditioning. These steps convert the carbon source to simple molecules, predominantly carbon monoxide and hydrogen, which are active ingredients of synthesis gas. Syngas also contains carbon dioxide, water vapor, methane, and nitrogen. Impurities deleterious to catalyst operation such as sulfur and nitrogen compounds are often present in trace amounts and are removed to very low concentrations, often as part of synthesis gas conditioning. Once the syngas is created and conditioned, the conditioned syngas is used as an input to an FT reactor having an FT catalyst to make the liquid FT hydrocarbons in a Fischer-Tropsch synthesis process. Depending on the type of FT reactor, the FT conversion of the syngas to liquid FT hydrocarbons takes place under appropriate operating conditions.

Depending on the physical form of the carbon-containing energy source, syngas preparation may involve technologies such as steam methane reforming, gasification, carbon monoxide shift conversion, acid gas removal gas cleaning and conditioning. These steps convert the carbon-containing energy source to simple molecules, predominantly carbon monoxide and hydrogen, which are the active ingredients of synthesis gas. The synthesis gas will also contain carbon dioxide, water vapor, methane, nitrogen. Impurities deleterious to catalyst operation such as sulfur and nitrogen compounds are often present in trace amounts and are removed to very low concentrations as part of synthesis gas conditioning.

Turning to the syngas conversion step, to create the syngas from natural gas, for example, methane in the natural gas reacts with steam and oxygen in a syngas preparation unit to create syngas. The syngas comprises principally carbon monoxide, hydrogen, carbon dioxide, water vapor and unconverted methane. When partial oxidation is used to produce the synthesis gas, typically, the syngas contains more carbon monoxide and less hydrogen than is optimal and consequently, steam is added to the react with some of the carbon monoxide in a water-gas shift reaction. The water gas shift reaction can be described as:

$$CO + H_2O \leftrightharpoons H_2O + CO_2 \quad (1)$$

Thermodynamically, there is an equilibrium between the forward and the backward reactions. That equilibrium is determined by the concentration of the gases present.

Turning now to the FT conversion step, the Fischer-Tropsch (FT) reactions for the FT conversion of the syngas to the liquid FT hydrocarbons may be simplistically expressed as:

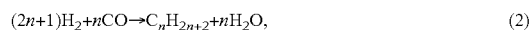

$$(2n+1)H_2 + nCO \rightarrow C_nH_{2n+2} + nH_2O, \quad (2)$$

where 'n' is a positive integer.

The FT reaction is performed in the presence of a catalyst, called a Fischer-Tropsch catalyst ("FT catalyst"). Unlike a reagent, a catalyst does not participate in the chemical reaction and is not consumed by the chemical reaction itself, but accelerates the chemical reaction. In addition, a catalyst may participate in multiple chemical transformations. Catalytic reactions have a lower rate-limiting free energy of activation than the corresponding un-catalyzed reaction, resulting in higher reaction rate at the same temperature. However, the mechanistic explanation of catalysis is complex. Catalysts may affect the reaction environment favorably, or bind to the reagents to polarize bonds, e.g. acid catalysts for reactions of carbonyl compounds, or form specific intermediates that are not produced naturally, such as osmate esters in osmium tetroxide-catalyzed dihydroxylation of alkenes, or cause lysis of reagents to reactive forms, such as atomic hydrogen in catalytic hydrogenation.

In addition to liquid FT hydrocarbons, Fischer-Tropsch synthesis also commonly produces gases ("Fischer-Tropsch tail gases" or "FT tail gases") and water (("Fischer-Tropsch water" or "FT water"). The FT tail gases typically contain CO (carbon monoxide), $CO_2$ (carbon dioxide), $H_2$ (hydrogen), light hydrocarbon molecules, both saturated and unsaturated, typically ranging from $C_1$ to $C_4$, and a small amount of light oxygenated hydrocarbon molecules such as methanol. Typically, the FT tail gases are mixed in an FT facility's fuel gas system for use as fuel.

The FT water may also contain contaminants, such as dissolved hydrocarbons, oxygenates (alcohols, ketones, aldehydes and carboxylic acids) and other organic FT products. Typically, the FT water is treated in various ways to remove the contaminants and is properly disposed of.

A variety of FT catalysts is utilized to catalyze the Fischer-Tropsch synthesis, with cobalt-based catalysts and iron-based catalysts being the most prevalent. In addition, most FT catalysts are either supported or precipitated. If an FT catalyst is supported, a metal-based catalyst is deposited upon the interior of a metal structure resembling a tunnel, having a mouth or "pore." The structure that the FT catalyst is deposited upon is very small as are the pores. The FT catalysts may deactivate by a variety of mechanisms. Reasons for Fischer-Tropsch catalyst deactivation include, without limitation: the oxidation of the active metal of the FT catalyst, e.g. oxidation of cobalt to cobalt oxide; plugging of the FT catalyst pores with heavy hydrocarbons; reaction of the active metal, such as cobalt; and blocking of active sites on the surface of the FT catalyst.

Various FT catalysts used in FT reactors have a high reactivity to oxygen or water. This makes it difficult to handle the FT catalysts in the open air, without reducing the effectiveness of the FT catalysts. Many FT catalysts are commercially available in a non-reactive or non-activated state to permit the FT catalyst to be handled safely with little to no special handling requirements needed to protect the effectiveness of the FT catalyst. However, such non-reactive FT catalysts require a chemical change in their compositions, called "activation," before the FT catalysts can be used. Activation sometimes requires that the FT catalyst be exposed to high temperatures and to one or more gases ("activation gases"). One or more of the activation gases react with the FT catalyst to put the FT catalyst in a reactive state. As mentioned in the Nomenclature section herein, activation gases may perform oxidation or reduction or may be inert. In addition, after an FT catalyst has been in use for some period of time, the FT catalyst may become less effective and require regeneration, which includes procedures that may be similar to or may differ somewhat from activation procedures. As with activation gases, regeneration gases may perform reduction, oxidation or may be inert.

Heat transfer fluids ("HTF"), or similar heating media, have been used in liquid form to heat the FT catalyst in place within an FT reactor ("in situ") while the FT catalyst is exposed to an activation (or regeneration) gas. If an HTF is used, operating pressures required within a shell of the FT reactor may be less than steam, even if the steam is used at the same temperature that the HTF is used. However, a volume of liquid HTF's needed to fill the FT reactor can be large.

Accordingly, there are needs in the art for novel systems and methods for FT catalyst activation and regeneration. Desirably, such systems and methods enable activation or regeneration of an FT catalyst in situ.

SUMMARY

One or more embodiments of the present disclosure include methods of increasing the activity level of a Fischer-Tropsch ("FT") catalyst in situ, which include heating a heat transfer fluid ("HTF") to a vapor state at a predetermined HTF temperature using an HTF vaporizer. A stream of the vaporous HTF is provided to an input of a shell side of an FT reactor. The FT reactor has a tube side as well as the shell side, and contains an at least partially non-active FT catalyst in a plurality of FT catalyst-filled tubes. The vaporous HTF heats the FT reactor to a predetermined reactor temperature, the vaporous HTF cooling and at least partially condensing to a liquid HTF as the HTF passes through the shell side of the FT reactor to an output of the shell side. The liquid HTF passes through the output of the shell side of the FT reactor and is returned to the HTF vaporizer for re-heating into the vaporous HTF. While continuing to provide the stream of vaporous HTF into the FT reactor on the shell side sufficient to maintain the predetermined reactor temperature, at least one FT catalyst activity-related gas is provided into the FT reactor on the tube side to contact the at least partially non-active FT catalyst.

One or more embodiments of the present disclosure include methods of increasing the activity level of a Fischer-Tropsch ("FT") catalyst in situ, which include (a) heating an HTF to a vapor state at a predetermined stage HTF temperature using an HTF vaporizer, (b) providing a stream of the heated HTF vapor to an input of a shell side of an FT reactor to heat the FT reactor to a predetermined stage temperature, the FT reactor containing a plurality of FT catalyst-filled tubes and having the shell side and a tube side, wherein the FT catalyst in the FT catalyst-filled tubes at least partially non-active, (c) passing a stream of HTF liquid, which has condensed from the HTF vapor as the HTF vapor passes through the FT reactor on the shell side, through an output of the shell side and returning the stream of HTF liquid to the HTF vaporizer for re-heating into the HTF vapor, and (d) while continuing to provide the stream of HTF vapor into the FT reactor on the shell side sufficient to maintain the predetermined stage temperature, providing at least one stage FT catalyst activity-related gas into the FT reactor on the tube side to contact the at least partially non-active FT catalyst. Steps (a)-(d) are repeated for a predetermined number of stages sufficient to at least partially regenerate the at least partially non-active FT catalyst, with each stage has its own predetermined stage HTF temperature to which the HTF vapor is heated, its own predetermined stage temperature to which the FT reactor is heated, its own at least one stage FT catalyst activity-related gas for contacting the FT catalyst and its own predetermined stage duration, during which the at least one stage FT catalyst activity-related gas is provided to contact the FT catalyst.

One or more embodiments of the present disclosure include methods of improving the activity of an at least partially non-active Fischer-Tropsch ("FT") catalyst in a tubular FT reactor, which includes heating a heat transfer fluid ("HTF") to a vapor state, using the heated HTF in a vapor state to achieve and maintain the at least partially non-active FT catalyst at a predetermined stage temperature; and exposing the at least partially non-active FT catalyst to at least one stage FT catalyst activity-related gas for a stage duration.

One or more embodiments of the present disclosure include systems for increasing the activity of a Fischer-Tropsch ("FT") catalyst, which include a heat transfer fluid ("HTF") vaporizer for heating a heat transfer fluid ("HTF") to a vapor state. The systems also include an FT reactor containing a plurality of FT catalyst-filled tubes and having a shell side and a tube side, wherein the FT catalyst in the FT catalyst-filled tubes is at least partially non-active. The FT reactor further comprises an HTF inlet on the shell side, an HTF outlet on the shell side, a process inlet on the tube side and a process outlet on the tube side, the HTF outlet permitting passage out of the FT reactor of an HTF liquid that has condensed from the HTF vapor as the HTF vapor passes through the FT reactor on the shell side. The process inlet and the process outlet allow passage of at least one FT catalyst activity-related gas through the FT reactor on the tube side to contact the at least partially non-active FT catalyst. The systems also include a flowline for providing the heated HTF vapor to the shell side of the FT reactor via the HTF inlet to permit the HTF vapor to heat the FT reactor to a predetermined reactor temperature and to maintain the FT reactor at the predetermined reactor temperature for a stage duration; and a HTF liquid flowline to transport the HTF liquid from the HTF outlet to the HTF vaporizer for re-heating into the HTF vapor.

One or more embodiments of the present disclosure include apparatuses for providing a vaporous heat transfer fluid ("HTF") to provide a pre-determined temperature for a process of increasing the activity of a Fischer-Tropsch ("FT") catalyst, which include a heat transfer fluid ("HTF") vaporizer for heating the HTF to a vapor state at a predetermined temperature, the HTF vaporizer having an HTF liquid inlet and an HTF vapor outlet.

These and other embodiments, features and advantages will be apparent in the following detailed description and drawings.

BRIEF DESCRIPTION OF THE DRAWINGS

For a more detailed description of the present invention, reference will now be made to the accompanying drawings, wherein.

NOTATION AND NOMENCLATURE

Figure 1:
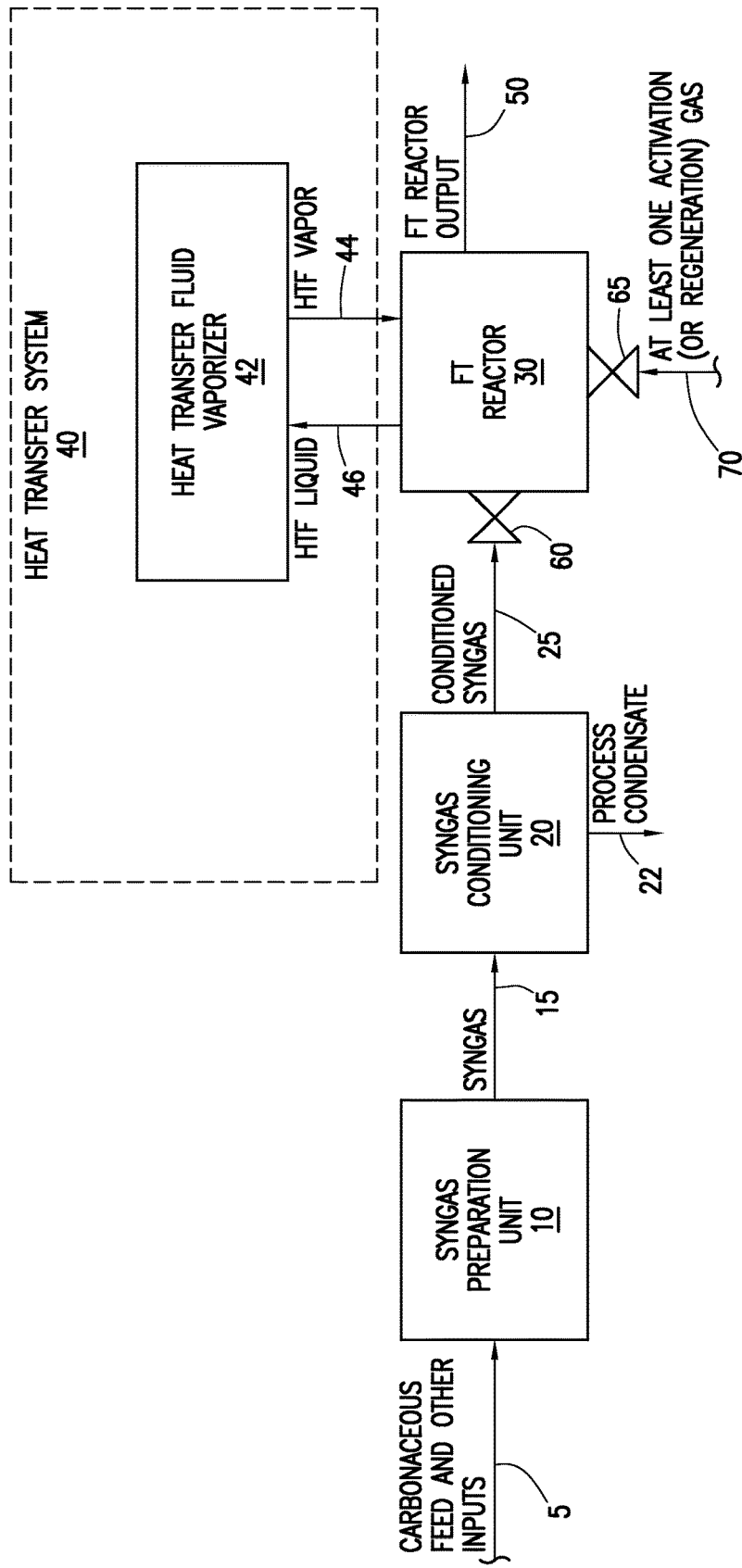
FIG. 1 depicts a simplified block diagram of a Fisher Tropsch system having a heat transfer system, in accordance with one or more embodiments of the present disclosure.

As used herein, the abbreviation "FT" and/or "F-T" stand for Fischer-Tropsch (which may also be written "Fischer Tropsch").

As used herein, the term "FT catalyst" means a catalyst used in an FT reactor. Unlike a reagent, a catalyst accelerates the chemical reaction and is not consumed by the reaction itself. In addition, a catalyst may participate in multiple chemical transformations. The activity level of an FT catalyst may decrease over time with use. FT catalysts may be iron-based, cobalt-based or may be any other catalyst used in an FT reactor to produce FT hydrocarbons from syngas.

As used herein, the phrase "a high-temperature Fischer-Tropsch (or 'HTFT') reactor" means an FT reactor that is typically operated at temperatures of 330° C.-350° C., which typically employs an iron-based FT catalyst. This process has been put to use extensively by Sasol in their Coal-to-Liquid (CTL) plants. As used herein, the phrase "a low-temperature Fischer-Tropsch (or 'LTFT') reactor" means an FT reactor that is operated at lower temperatures, generally in a range between 170° C.-235° C., which typically employs a cobalt-based FT catalyst. FT reactors come in a variety of configurations, including without limitation tubular FT reactors, slurry FT reactors, bubble column FT reactors and compact FT reactors. As used herein, the term "tubular reactor" refers to Fischer-Tropsch reactors containing one or more tubes containing FT catalyst, wherein the inner diameter or average width of the one or more tubes is typically greater than about 0.5". Use of the term "tubular" is not meant to be limiting to a specific cross sectional shape. For example, tubes may have a cross-sectional shape that is not circular. Accordingly, the tubes of a tubular reactor may, in one or more embodiments, have a circular, oval, rectangular, and/or other cross sectional shape(s).

As used herein, the term "FT tail gas" means gas produced from an FT reactor. The FT tail gas may typically contain unreacted hydrogen and carbon monoxide, as well as carbon dioxide, some light hydrocarbons, and other light reaction byproducts.

As used herein, the term "FT water" means water produced by an FT reaction. The FT water will typically include dissolved oxygenated species, such as alcohols, and light hydrocarbons.

As used herein, the term "liquid FT hydrocarbon products" means liquid hydrocarbons produced by an FT reactor.

As used herein, the terms "reformed gas" or "syngas" means the effluent from a syngas conversion unit, such as (without limitation) a steam methane reformer, autothermal reformer, hybrid reformer, or partial oxidation reformer. Steam methane reformers do not use oxygen as part of the process; autothermal reformers do. Both use reformer catalysts. Hybrid reformers are a combination of steam methane reforming, as a first step, and an autothermal reforming with oxidation as a second step. Partial oxidation reformers are similar to autothermal reformers, but do not include the use of a reformer catalyst.

As used herein, the term "FT tail gas purge stream" means excess FT tail gas removed from the primary FT tail gas stream. The FT purge stream has the same composition as the FT tail gas.

As used herein, the term "to superheat" a fluid means to heat the fluid above its steam dew point (or saturation point). Specific preferred temperature ranges are noted.

As used herein, the terms "heat transfer fluid(s)" or "HTF('s)" mean a fluid having good heat transfer properties and includes organic/hydrocarbon compounds, such as oils, water, steam, a glycol-water mixture, and molten inorganic salts. Other additives such as antioxidants may also be included in an HTF. The HTF selected for a particular application with certain operating conditions, for example a particular temperature and/or pressure range, would preferably be one that would be stable for those operating conditions. For certain embodiments disclosed herein, an HTF comprising an organic compound would likely be preferable, but that depends on particulars of the application and its operating conditions. Many HTF's are available commercially, such as but limited to Dowtherm® A, available from Dow Chemical.

As used herein, the term "sweet natural gas" means natural gas from which any excess sulfur or sulfur compounds such as $H_2S$ has been previously removed.

As used herein, the phrase "at least partially non-active FT catalyst" includes FT catalysts that have never been activated, FT catalysts that have been partially activated but have not been fully activated and FT catalysts that have become at least partially de-activated through use.

As used herein, the phrase a "low $H_2$/CO ratio," means a ratio lower than the 2:1 stoichiometric ratio of a Fischer Tropsch reaction.

As used herein, the terms "activation gas" or "activation gases" include gases that are used in a process to put an FT catalyst, which has either never been activated or has only partially been activated, into a more active state. Activation gases may perform oxidation or reduction or may be inert. Inert activation gases may be used, for example, as a step in a multi-step activation process.

As used herein, the terms "regeneration gas" or "regeneration gases" include gases that are used in a process to put an FT catalyst that has become at least partially de-activated, such as through use, into a more active state. Regeneration gases may perform oxidation or reduction or may be inert. Inert regeneration gases may be used, for example, as a step in a multi-step regeneration process.

As used herein, the term "FT catalyst activity-related gas" (or "FT catalyst activity-related gases") may mean either an activation gas/gases or a regeneration gas/gases. Such an FT catalyst activity-related gas may perform oxidation or reduction or may be inert.

DETAILED DESCRIPTION

If an HTF is used in its vapor state for FT catalyst activation or regeneration, instead of in a liquid form, less of the HTF may be required and it may result in a higher heat transfer coefficient. The particular HTF (or combination of HTF's) to be used in its (their) vapor form would preferably be selected based on the conditions required when activating or regenerating the particular FT catalyst used. For one or more embodiments of the present disclosure, an HTF comprising an organic compound may be preferred. For one or more embodiments of the present disclosure, an HTF comprising an oil may be preferred.

FIG. 1 depicts a simplified flow diagram for a Fischer Tropsch system in accordance with the present disclosure. Carbonaceous feed and other inputs 5 enter a syngas preparation unit 10. The carbonaceous feed may comprise natural gas or processed coal, processed biomass or processed carbonaceous waste, such as processed municipal waste. The other inputs will depend on the type of carbonaceous feed used and the type of syngas preparation unit 10 selected. The syngas preparation unit 10 converts the carbonaceous feed and other inputs 5 into a syngas 15 comprising hydrogen and carbon. Byproducts may also be produced by the syngas preparation unit 10, but are not depicted in FIG. 1. The syngas preparation unit 10 may be any syngas preparation unit, including but not limited to a steam methane reformer, an autothermal reformer, a partial oxidation system or a hybrid reformer. The syngas 15 may require conditioning before being used as a feed to an FT reactor. The type of conditioning used may vary depending on the type of carbonaceous feed used, and the type of syngas preparation unit 10 selected, as well as particulars of FT catalyst used in the FT reactor, the type of FT reactor selected and its operating conditions. Typically, the conditioning of the syngas includes removal of process condensate 22 from the syngas. Conditioning may also include adjusting ratios of hydrogen and carbon monoxide in the syngas. As depicted in FIG. 1, the syngas 15 may passes via a first syngas flowline to a syngas conditioning unit 20, in which, for example, the process condensate 22 is removed and the hydrogen and carbon monoxide ratios of the syngas are adjusted to pre-determined levels, if needed, to create a conditioned syngas 25. The process condensate stream 22 leaves the syngas conditioning unit 20 via a condensate flowline. (Flowlines in the figures are not separately numbered or depicted, but are represented with respect to the fluids they carry.) During operation, the conditioned syngas 25 is sent via a second syngas flowline to an FT reactor 30, having an FT catalyst, for processing into an FT reactor output 50 comprising liquid FT hydrocarbons, along with an FT tail gas and FT water. The liquid FT hydrocarbons 50 may comprise an FT naphtha component, an FT diesel component and an FT wax component, depending upon the particulars of the conditioned syngas 25, the FT catalyst selected and the type FT reactor 30 selected, along with operating conditions used with the FT reactor 30. The FT reactor 30 may be a tubular reactor, having a plurality of tubes (not separately depicted in FIG. 1), preferably passing longitudinally within the FT reactor 30 containing the FT catalyst. The plurality of tubes may be called FT catalyst-filled tubes, when the FT catalyst has been loaded into the plurality of tubes. The tubular FT reactor has a "tube-side," meaning within the catalyst tubes, and a "shell side," meaning inside the FT reactor, but outside of the catalyst tubes. During an FT conversion operation, the conditioned syngas enters the tube side of the FT reactor 30, which produces an FT output 50 comprising liquid FT hydrocarbons, an FT water and an FT tail gas.

However, an FT conversion cannot take place unless the FT catalyst has been activated. If the FT catalyst has been loaded into the plurality of tubes in an inactive state or has been used in an FT process for a period of time and are consequently in an inactive or semi-active state, the FT catalyst may be termed an at least partially non-active FT catalyst. The least partially non-active FT catalyst may be activated (or regenerated), in accordance with one of more embodiments of the present disclosure. In embodiments, the partially non-active FT catalyst may be activated (or regenerated) in place ("in situ"), that is, within the FT reactor. During activating or regenerating procedures, the conditioned syngas 25 is not provided to the FT reactor 30. In some cases, the production of syngas has not begun, such as might be the case of an initial activation of the FT catalysts or, if the FT catalysts have been deactivated through use, the production of syngas is stopped and the syngas is blocked from being provided to the FT reactor, such as through a first valve 60 being closed. To create the appropriate conditions for activating (or regenerating) the at least partially non-active FT catalyst in situ, the FT reactor interacts with a heat transfer system 40. The heat transfer system 40 includes a heat transfer vaporizer 42, a first HTF flowline that conveys a heat transfer fluid in the form of vapor ("HTF vapor" or "vaporous HTF") 44 from the heat transfer vaporizer 42 to the FT reactor 30 and a second HTF flowline that conveys a heat transfer fluid in the form of liquid ("HTF liquid") 46 from the FT reactor 30 to the heat transfer vaporizer 42. In operation, the heat transfer vaporizer 42 heats a heat transfer fluid ("HTF") to a vapor state. The HTF vapor 44 passes from the heat transfer vaporizer 42 to the shell side of FT reactor 30 via the first HTF flowline. The HTF vapor 44 heats the FT reactor 30, with its FT catalyst-filled tubes, to a pre-determined temperature for FT catalyst activation (or regeneration). As the HTF vapor 44 transfers heat to the FT reactor 30, the HTF vapor 44 cools and condenses, forming the HTF liquid 46. The HTF liquid 46 is preferably returned to the heat transfer fluid vaporizer 42 to be heated to become the HTF vapor 44, which is sent to the FT reactor 30. When the FT reactor 30 reaches the pre-determined temperature, at least one activation (or regeneration) gas 70 is supplied to the tube side of the FT reactor 30, such as through the opening of a second valve 65 that had previously been shut. (Although FIG. 1 appears to depict that the at least one activation (or regeneration) gas 70 would pass through the second valve 65 and enter the FT reactor through an inlet other that the inlet used by the conditioned syngas during FT synthesis operation, in other embodiments, the same inlet would be used for both the conditioned syngas and the at least one activation (or regeneration) gas 70.) The particular activation (or regeneration) gas or gases 70 would be selected depending on the type of FT catalyst to be used. The selected at least one activation (or regeneration) gas 70 passes into and through the catalyst-filled tubes of the FT reactor 30 and chemically reacts with the FT catalyst to change the FT catalyst from the at least partially non-active state into a more activated or a fully activated state. For an activation (or regeneration) procedure, the FT reactor output 50 would comprise a gas or gases that result ("resulting gas(es)") from the reaction between the at least one activation gas (or regeneration gas) and the FT catalyst. (If the activation gas or regeneration gas is inert, the resulting gas would comprise the inert gas.)

In one or more embodiments of the present disclosure, the activation (or regeneration) procedure comprises a single stage, using one predetermined temperature and a single selection of at least one activation (or regeneration) gas 70. In one or more embodiments of the present disclosure, the activation (or regeneration) procedure comprises a plurality of stages, each having its own predetermined temperature and predetermined duration. One or more stages might have the same predetermined temperature and predetermined duration, or the predetermined temperature and pre-determined duration of each stage might be different, depending upon the FT catalyst used, the particular activation or regeneration gas/gases used and the activation or regeneration procedure selected. Some FT catalysts may be activated (or regenerated) by more than one procedure, so an operator may then select which procedure the operator desires to use. In a multi-stage embodiment, at least one or more stages would include at least one activation (or regeneration) gas 70 (or gas combination), but one or more stages might not require an activation (or regeneration) gas. For example, an inert gas, such as nitrogen, could be used in one or more stages. In such a multi-stage embodiment, a single HTF might be used for all stages or one or more different HTF's might be used for different stages if needed to achieve different predetermined temperatures required for the different stages. One or more stages might be designed to cool the FT catalysts and the FT reactor to temperatures lower than the predetermined temperature of the previous stage. In such cooling stages, the velocity of the gas passing on the tube side of the FT reactor might be increased and a liquid HTF, cooler than the predetermined temperature of the previous stage, might be passed through the shell side of the FT reactor, until a desired cooler temperature is reached. In a multi-stage embodiment, one or more stages might comprise a flushing stage, wherein the gas used on the tube side of the FT reactor is an inert gas, and during which impurities are flushed from the catalysts.

Figure 2:
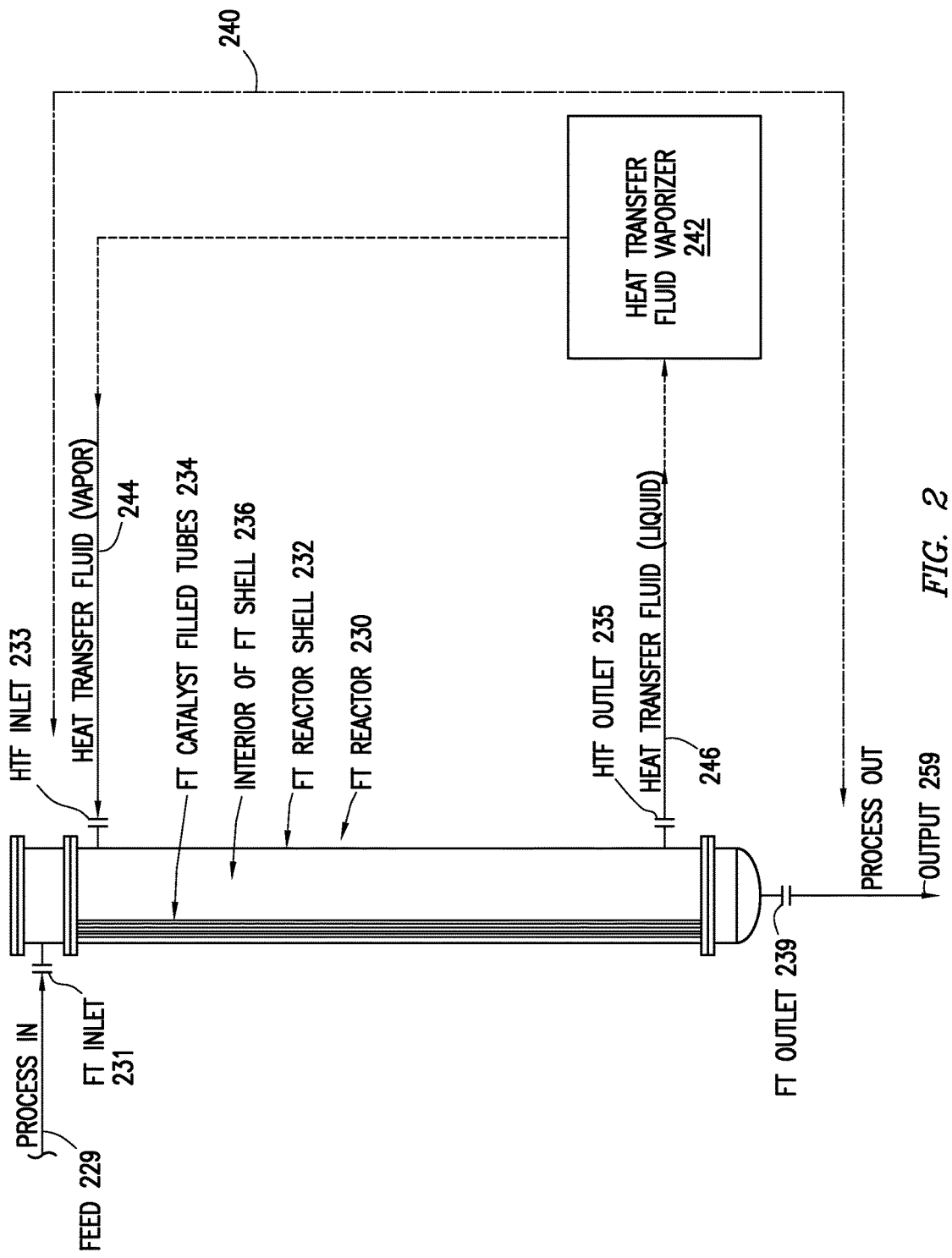
FIG. 2 depicts a diagram of a Fisher Tropsch reactor and heat transfer system in accordance with one or more embodiments of the present disclosure.

FIG. 2 depicts a representation of a Fisher Tropsch (FT) reactor 230 and a heat transfer system 240 in accordance with one or more embodiments of the present disclosure.

The FT reactor as depicted in FIGS. 2-5 is representative. While the FT catalyst-filled tubes are depicted as being on one side of the FT reactor, that depiction is merely for clarity. In embodiments, the FT catalyst-filled tubes are spaced within the FT reactor, either evenly or in other patterns.

Referring again to FIG. 2, the heat transfer system 240 includes a heat transfer fluid vaporizer 242, an HTF vapor 244 passing via an HTF vapor flowline from the heat transfer fluid vaporizer 242 to the FT reactor 230, and a HTF liquid 246 passing via an HTF liquid flowline from the FT reactor 230 to the heat transfer fluid vaporizer 242. The FT reactor 230 includes an FT inlet 231, an FT reactor shell 232 and an FT outlet 239. The FT inlet 231 allows the passage of a "process in" feed 229 to enter the FT reactor 230 for processing. The FT outlet 239 allows a "process out" output 259 to exit the FT reactor 230.

Continuing to refer to FIG. 2, the FT reactor shell 232 preferably has a top and a bottom and includes an interior 236 containing a plurality of FT catalyst-filled tubes 234 (each FT catalyst filled tube having a top and a bottom) placed longitudinally and spaced within the interior. When the "process in feed" 229 enters the FT reactor 230 via the FT inlet 231, the "process in feed" 229 enters through the tops of plurality of FT catalyst-filled tubes 234 and passes through the plurality of FT catalyst-filled tubes 234 to the bottom of the FT catalyst-filled tubes 234 and out of the FT reactor via the FT outlet 239. The FT catalyst within the plurality of catalyst-filled tubes 234 is an FT catalyst that promotes conversion of syngas to liquid FT hydrocarbons. For example without limitation, the FT catalyst may be iron-based or cobalt-based or another FT catalyst. The FT reactor 230 also includes an HTF inlet 233 and an HTF outlet 235 that respectively permit an HTF fluid vapor form to enter on the shell side of the FT reactor and the collected HTF liquid to exit the interior of the FT shell 236, outside of the plurality of FT catalyst-filled tubes 234.

If the FT reactor 230 were in operation performing FT synthesis, with activated FT catalysts within the plurality of FT catalyst-filled tubes 234, the "process in" feed 229 may comprise conditioned syngas. However, during an FT catalyst activation process, the "process in" feed 229 comprises at least one activation gas used to activate the FT catalyst. (During an FT catalyst regeneration process, the "process in" feed 229 comprises at least one regeneration gas used to activate the at least partially deactivated FT catalyst.)

Similarly, if the FT reactor 230 were in operation performing FT synthesis, with activated FT catalysts and the conditioned syngas as the process in feed 229, the "process out" output 259 would comprise liquid FT hydrocarbons, FT water and an FT tail gas that exit the FT reactor 230 via one or more FT outlet(s) 239. During an FT catalyst activation process, however, the "process out" output 259 comprises one or more activation-resulting gases that result from the reaction of the at least one activation gas with the FT catalyst. Loosely speaking, however, the activation gas may be said to pass through the FT reactor. (Furthermore, activation or regeneration gases that are inert pass through the FT reactor with little, if any, change.) Similarly, during an FT catalyst regeneration process, however, the "process out" output 259 comprises one or more regeneration-resulting gases that result from the reaction of the at least one regeneration gas with the FT catalyst. Like the activation gas, loosely speaking, the regeneration gas may be said to pass through the FT reactor. Thus, in the embodiment of FIG. 2, an FT catalyst activity-related gas, which may comprise an activation gas or a regeneration gas, enters the FT reactor 230 through the FT inlet 231 and leaves the FT reactor 230 (as an activation-resulting gas or as a regeneration-resulting gas, depending on the process) through the FT outlet 239, during appropriate periods as part of an activation or regeneration process. The activation or regeneration process may include a single stage or may be a multi-stage process.

Continuing to refer to FIG. 2, initially during an activation or regeneration process, the FT catalyst in place in the plurality of FT catalyst-filled tubes 234 in the FT reactor 230 would be in an at least partially non-active state (which may be a wholly inactive state or semi-activated state). The FT catalyst may be new and un-activated, new and partially activated or at least partially de-activated through use in an FT process. In an activation (or regeneration) process, with the FT catalyst in place within the plurality of FT catalyst-filled tubes 234, the heat transfer fluid vaporizer 242 heats the HTF liquid 246 to become the HTF vapor 244. The HTF vapor 244 passes out of the heat transfer fluid vaporizer 242 and, via the HTF vapor flowline, to the FT reactor 230. Passing through the HTF inlet 233, the HTF vapor 244 enters the interior of the FT shell 236 outside of the plurality of FT catalyst-filled tubes 234. (As previously described, this is called being on the "shell side" of the FT reactor 230, as opposed to being within the FT reactor tubes 234, which is also called being on the "tube side" of the FT reactor.) The HTF vapor 244 heats the FT reactor 230 and its contents to a predetermined activation (or regeneration) temperature by passing from the top of the FT reactor 230 to the bottom of the FT reactor 230, on the shell side. As the HTF vapor 244 cools, the HTF vapor 244 forms the HTF liquid 246, which collects at the bottom of the FT reactor 230. The HTF liquid 246 exits the interior of the FT shell 236 through the HTF outlet 235, preferably located near the bottom of the FT reactor 230, as depicted in FIG. 2. The HTF liquid 246 returns to the heat transfer fluid vaporizer 242 through the HTF liquid flowline. The heat transfer fluid vaporizer 242 heats the HTF liquid 246 to form the HTF vapor 244, which is cycled back to the FT reactor 230 as previously described.

Referring again to FIG. 2, once the FT reactor 230 is heated, preferably uniformly, to the predetermined activation (or regeneration) temperature, the "process in feed" 229 in the form of the at least one activation gas (or regeneration gas) stream, selected to be at least part of a process to activate (or regenerate) the particular FT catalyst used, is fed through the FT inlet 231 into the plurality of FT catalyst-filled tubes 234, preferably at the tops of the plurality of FT catalyst-filled tubes 234, and passes through the plurality of FT catalyst-filled tubes 234 to the bottom of the FT catalyst-filled tubes 234. In alternate embodiments, the activation (or regeneration) gas may be fed into an FT inlet at the bottom of an FT reactor and the resulting gas exits through an FT outlet at the top of the FT reactor.

Continuing again to FIG. 2, the at least one activation (or regeneration) gas stream passes through the plurality of FT catalyst-filled tubes 234, the at least one activation (or regeneration) gas stream reacts with the FT catalyst filling the FT catalyst-filled tubes 234, thus activating (or regenerating) the FT catalyst and producing one or more resulting gases (activation-resulting gases or regeneration-resulting gases) as a product of the reaction. The one or more resulting gases exit the FT catalyst-filled tubes 234 and the FT reactor 230 as process out output 259 through the FT outlet 239. The HTF vapor 244 continues flow through the interior of the FT shell 236 on the shell side to maintain the FT reactor 230 at the pre-determined activation (or regeneration) temperature. The at least one activation gas (or regeneration gas) stream continues enter the FT reactor 230 as described above to activate (or regenerate) the FT catalyst for a duration, which may be pre-determined. Just to give examples, a reduction step in an activation and/or regeneration process might, in some cases, require 48-72 hours, while an oxidation step in an activation and/or regeneration process might take about 170 hours. However, the duration is specific to the FT catalyst being activated (or regenerated) and the particulars of the process being used to do so. The duration may also vary significantly between a single stage activation (or regeneration) process and a multi-stage activation (or regeneration) process.

If a regeneration of an FT catalyst is performed using the one or more embodiments depicted in FIG. 2, the procedure would be similar to that described above, but at least one regeneration gas would be used instead of the at least one activation gas and a predetermined regeneration temperature would be used instead of the predetermined activation temperature.

In one or more alternate embodiments of the disclosure, a plurality of predetermined activation temperatures and/or activation gases may be used in a plurality of stages, each having a stage duration that may be stage-specific, to activate the FT catalyst, which, at the beginning of the process, is at least partially non-activated. In one or more alternate embodiments of the disclosure, a plurality of predetermined regeneration temperatures and/or regeneration gases may be used in a plurality of stages, each having a stage duration that may be stage-specific, to activate an FT catalyst, which, at the beginning of the process, is at least partially de-activated.

Figure 3:
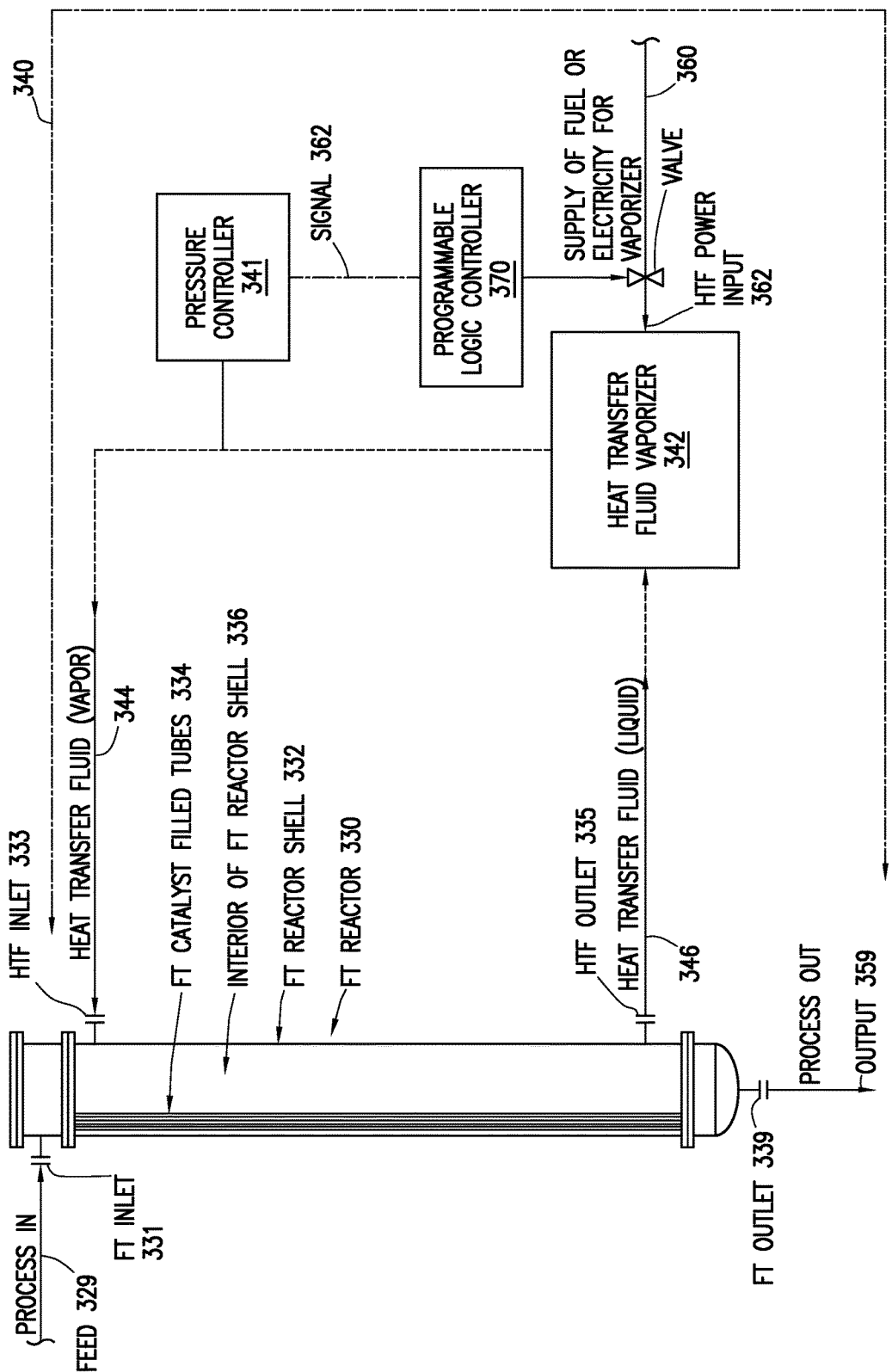
FIG. 3 depicts a diagram of a Fisher Tropsch reactor and heat transfer system that includes a pressure controller, in accordance with one or more embodiments of the present disclosure.
Figure 4:
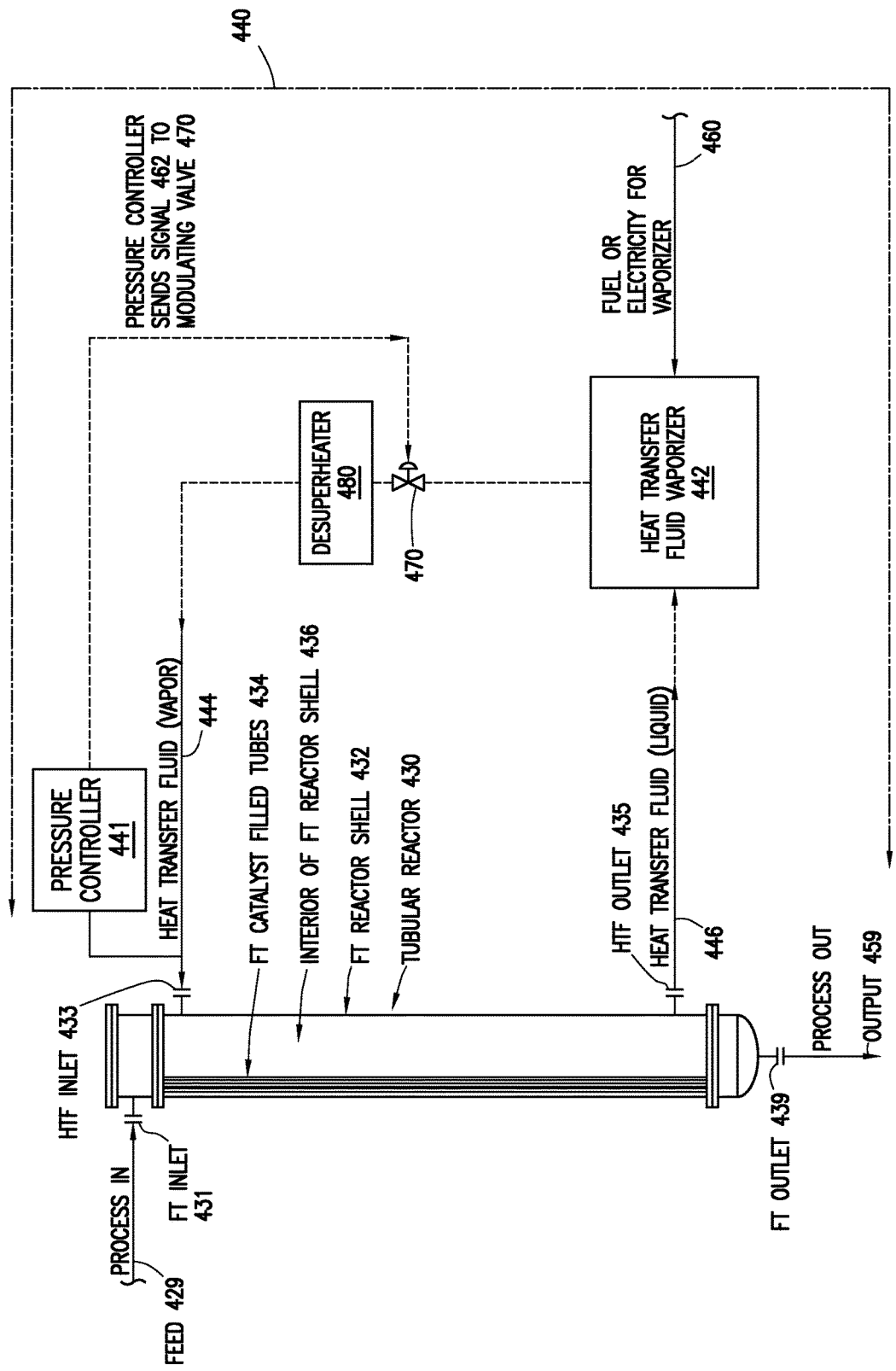
FIG. 4 depicts a block diagram of a Fisher Tropsch reactor and heat transfer system that includes a pressure controller and modulating valve configuration, in accordance with one or more embodiments of the present disclosure.
Figure 5:
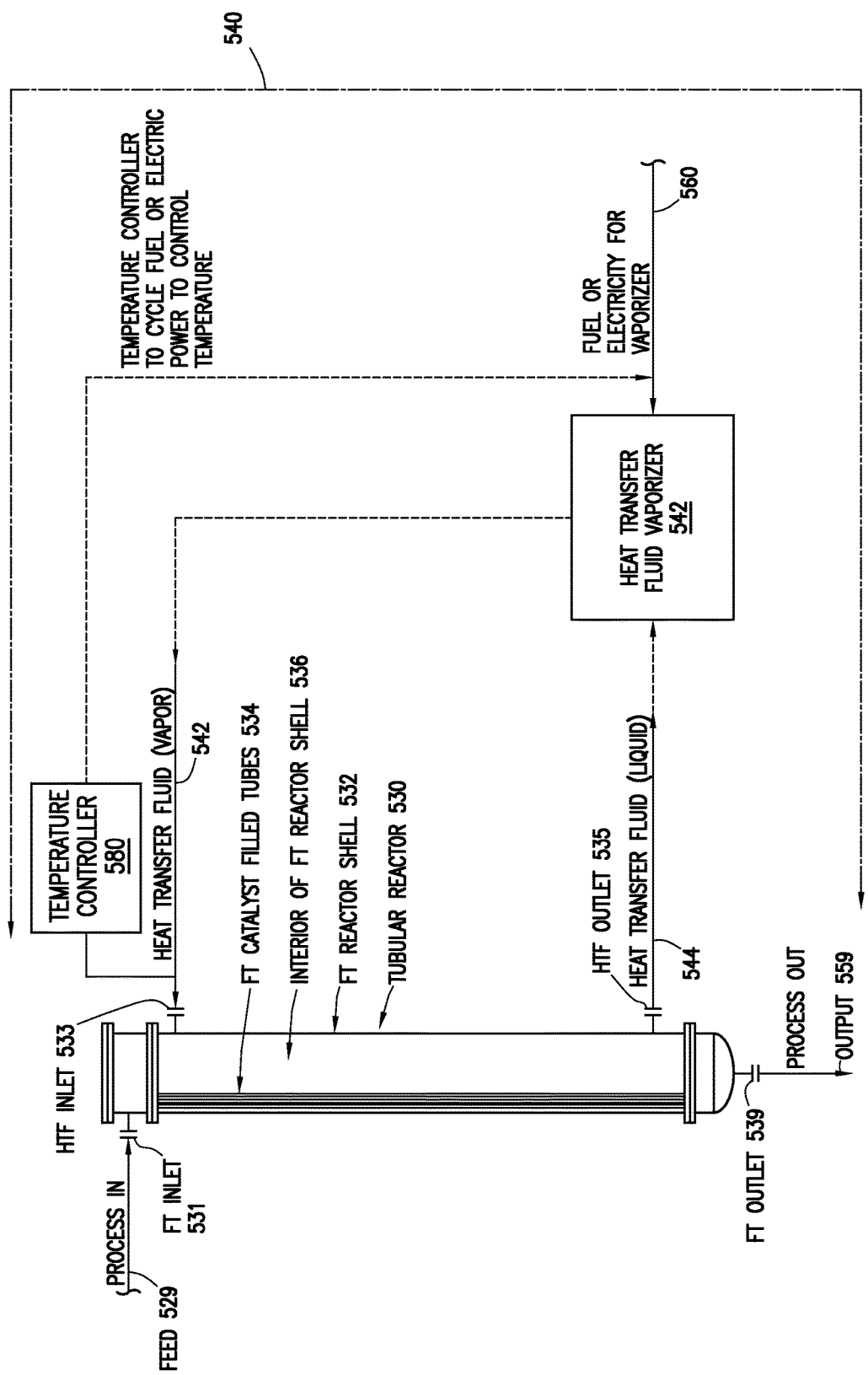
FIG. 5 depicts a block diagram of a Fisher Tropsch reactor and heat transfer system that includes a temperature controller, in accordance with one or more embodiments of the present disclosure.

FIGS. 3, 4 and 5 depict one or more embodiments for controlling the temperature of a HTF vapor and thus controlling the predetermined activation (or regeneration) temperature to which the FT reactor will be heated during an activation (or regeneration) process of the present disclosure.

FIG. 3 depicts a diagram of a Fisher Tropsch reactor 330 and heat transfer system 340 that includes a pressure controller 341, in accordance with one or more embodiments of the present disclosure. Each HTF vapor 344 has a saturation temperature. In the one or more embodiments of the present disclosure depicted in FIG. 3, the pressure controller 341 varies a heat load on an HTF transfer fluid vaporizer 342, thus varying the pressure of the HTF vapor and, indirectly, varying the saturation temperature of the HTF vapor 344. Specifically, the pressure controller 341 transmits a signal 362 to an HTF power input 362 or to a supply 360 of fuel or electricity for the HTF vaporizer, to vary how hot the HTF vaporizer 342 heats the HTF vapor 344. As depicted in the FIG. 3, the signal may pass to a programmable logic controller (PLC) 370, which may be supplied by the HTF vaporizer equipment supplier. The PLC 370 will then control a firing rate or an electrical input to the HTF vaporizer to set the pressure/temperature of the HTF vapor to desired levels or, as depicted in the FIG. 3, adjust a valve 372 to control supply 360 of fuel or electricity to the HTF vaporizer 342.

In FIG. 3, a heat transfer system 340 includes the heat transfer fluid (or HTF) vaporizer 342, an HTF vapor 344 passing via an HTF vapor flowline from the heat transfer fluid vaporizer 342 to an HTF inlet 333 of the FT reactor 330, and a HTF liquid 346 passing out of the HTF outlet 335 and into an HTF liquid flowline from the FT reactor 330 to the heat transfer fluid vaporizer 342. The FT reactor 330 includes an FT inlet 331, an FT reactor shell 332 and an FT outlet 339. The FT inlet 331 allows the passage of a "process in" feed 329 to enter the FT reactor 330 for processing. The FT outlet 339 allows a "process out" output 359 to exit the FT reactor 330.

Continuing to refer to FIG. 3, the FT reactor shell 332 preferably has a top and a bottom and includes an interior 336 and a plurality of FT catalyst-filled tubes 334 (each FT catalyst-filled tube having a top and a bottom) placed longitudinally and spaced within the interior 336. When the "process in feed" 329 enters the FT reactor 330 via the FT inlet 331, the "process in feed" 229 enters the plurality of FT catalyst-filled tubes 334 preferably through the tops of the FT catalyst-filled tubes and a "process out output" passes through the plurality of FT catalyst-filled tubes 334 to the bottom of the catalyst-filled tubes 334 and out of the FT reactor via the FT outlet 339. In alternate embodiments, the "process in feed" may be fed into an FT inlet at the bottom of an FT reactor and the "process out output" exits through an FT outlet at the top of the FT reactor. The FT catalyst within the plurality of FT catalyst-filled tubes 334 is an FT catalyst that promotes conversion of syngas to liquid FT hydrocarbons and may comprise an iron-based FT catalyst, a cobalt-based FT catalyst or other FT catalyst. The FT reactor 330 also includes an HTF inlet 333 and an HTF outlet 335 that respectively permit an HTF fluid to enter and to exit the interior 336 of the FT shell, outside of the plurality of FT catalyst-filled tubes 334.

If the FT reactor 330 were in operation performing FT synthesis, with activated FT catalysts within the plurality of FT catalyst-filled tubes 234, the "process in" feed 229 would comprise syngas, which may be conditioned syngas. When the FT reactor 330 is in operation performing FT synthesis, with activated FT catalysts, the process out" output 359 comprises liquid FT hydrocarbons 350, FT water 352 and an FT tail gas 354 that exit the FT reactor 330 via the FT outlet 339. In alternate embodiments, there may be more than one FT outlet 339

However, during an FT catalyst activation process, the "process in" feed 329 comprises at least one activation gas used to activate the non-activated FT catalysts, which may vary depending upon the specific FT catalyst used. During an FT catalyst activation process, the "process out" output 359 comprises one or more result gases that result from the interaction of the at least one activation gas with the FT catalysts. Similarly, during an FT catalyst regeneration process, the "process in" feed 329 comprises at least one regeneration gas used to regenerate the at least partially deactivated FT catalysts and the "process out" output 359 comprises one or more result gases that result from the interaction of the at least one regeneration gas with the FT catalysts.

Referring again to FIG. 3, once the FT reactor 330 is uniformly heated to the predetermined activation (or regeneration) temperature, the "process in feed" 329 comprising an activation (or regeneration) gas is introduced to the tops of plurality of FT catalyst-filled tubes 334 and passes through the plurality of FT catalyst-filled tubes 334 to the bottom of the FT catalyst-filled tubes 334 and out of the FT reactor via the FT outlet 339. Because this is an FT catalyst activation or regeneration operation, the "process in feed" 329 comprises at least one activation or regeneration gas, selected to activate or regenerate the particular FT catalyst used. The HTF vapor 344 continues flow through the interior of the FT shell 336 on the shell side to maintain the FT reactor 330 at the pre-determined activation temperature. The "process in feed" 329 is allowed to continue to enter the FT reactor 330 as described above for a pre-determined time period. Just to give examples, a reduction step in an activation and/or regeneration process might in some cases require 48-72 hours, while an oxidation step in an activation and/or regeneration process might take about 170 hours. However, the pre-determined time period is specific to the FT catalyst being activated (or regenerated) and the particulars of the process being used to do so. The predetermined time period may also vary significantly between a single stage activation (or regeneration) process and a multi-stage activation (or regeneration) process. In alternate embodiments, the FT catalyst may be monitored to determine its level of activation and the timing of the procedure may be adjusted accordingly.

In one or more alternate embodiments of the disclosure, a plurality of predetermined activation temperatures and/or activation gases may be used in a plurality stages, each having a stage duration that may be stage-specific, to activate the FT catalyst. In one or more alternate embodiments of the disclosure, a plurality of predetermined regeneration temperatures and/or regeneration gases may be used in a plurality stages, each having a stage duration that may be stage-specific, to regenerate the FT catalyst.

FIG. 4 depicts a diagram of a Fisher Tropsch reactor 430 and a heat transfer system 440 that includes a pressure controller 441 and a modulating valve configuration, in accordance with one or more embodiments of the present disclosure. In FIG. 4, the heat transfer system 440 includes a heat transfer fluid (or HTF) vaporizer 442, an HTF vapor 444 passing via an HTF vapor flowline from the heat transfer fluid vaporizer 442 to the FT reactor 430, and a HTF liquid 446 passing via an HTF liquid flowline from the FT reactor 430 to the heat transfer fluid vaporizer 442. The FT reactor 430 includes an FT inlet 431, an FT reactor shell 432 and an FT outlet 439. The FT inlet 431 allows the passage of a "process in" feed 429 to enter the FT reactor 430 for processing. The FT outlet 439 allows a "process out" output 459 to exit the FT reactor 430.

Continuing to refer to FIG. 4, the FT reactor shell 432 preferably has a top and a bottom and includes an interior 436 and a plurality of FT catalyst-filled tubes 434 (each FT catalyst-filled tube having a top and a bottom) placed longitudinally and spaced within the interior 436. When the "process in feed" 429 enters the FT reactor 330 via the FT inlet 331, the "process in feed" 429 enters the plurality of FT catalyst-filled tubes 434 preferably through the tops of the FT catalyst-filled tubes 434 and passes through the plurality of FT catalyst-filled tubes 434 to the bottom of the catalyst-filled tubes 434 and out of the FT reactor via the FT outlet 439. The FT catalyst within the plurality of FT catalyst-filled tubes 434 is an FT catalyst that promotes conversion of syngas to liquid FT hydrocarbons. The FT reactor 430 also includes an HTF inlet 433 and an HTF outlet 435 that respectively permit an HTF vapor to enter and to exit the interior 436 of the FT shell, outside of (i.e. on the shell side of) the plurality of FT catalyst-filled tubes 434.

If the FT reactor 430 were in operation performing FT synthesis, with activated FT catalysts within the plurality of FT catalyst-filled tubes 434, the "process in" feed 429 would comprise conditioned syngas and the process out" output 459 comprises liquid FT hydrocarbons 450, FT water 452 and an FT tail gas 354 that exit the FT reactor 430 via the FT outlet 439. However, during an FT catalyst activation process, the "process in" feed 429 comprises at least one activation gas used to activate the FT catalysts, which may vary depending upon the specific FT catalyst used and the "process out" output 459 comprises one or more result gases that result from the interaction of the at least one activation gas with the FT catalysts. Similarly, during an FT catalyst regeneration process, the "process in" feed 429 comprises at least one regeneration gas used to regenerate the FT catalyst, which may vary depending upon the specific FT catalyst used. During regeneration, the "process out" output 459 comprises one or more result gases that result from the interaction of the at least one regeneration gas with the FT catalysts.

In the one or more embodiments of the present disclosure depicted in FIG. 4, a modulating valve 470 is located on the HTF vapor flowline between the heat transfer fluid vaporizer 442 (also called an HTF vaporizer herein) and the HTF inlet 433. The modulating valve 470 controls flow of the HTF vapor through the HTF vapor flowline. The modulating valve 470 is coupled to a pressure controller 441, which is connected to the HTF vapor flowline downstream of the modulating valve 470. The pressure controller 441 senses pressure of the HTF vapor 444 in the HTF vapor flowline. The pressure controller 441 sends a signal 462 to the modulating valve 470, so that the modulating valve opens as the pressure of the HTF vapor 444 in the HTF vapor flowline drops by a predetermined pressure drop amount and closes when the pressure of the HTF vapor 444 in the HTF vapor flowline increases by a predetermined pressure increase amount, controlling the flow of the HTF vapor. Although optional, the addition of a desuperheater 480 downstream of the modulating valve 470, as depicted in FIG. 4, may provide a more precise temperature control for the HTF vapor 444 than provided by the modulating valve 470 alone.

During an activation procedure, once the FT reactor 430 of FIG. 4, is heated, preferably uniformly, to the predetermined activation temperature, the "process in feed" 429 of at least one activation gas, selected to activate the particular FT catalyst used, is introduced to the tops of plurality of FT catalyst-filled tubes 434 and passes through the plurality of FT catalyst-filled tubes 434 to the bottom of the FT catalyst-filled tubes 434 and out of the FT reactor 430 via the FT outlet 439. In alternate embodiments, the "process in feed" may be fed into an FT inlet at the bottom of an FT reactor and the "process out output" exits through an FT outlet at the top of the FT reactor. The predetermined activation temperature may be achieved and maintained through use of the modulating valve 470 is coupled to a pressure controller 441 as described above, with or without the addition of the desuperheater 480. The HTF vapor 444 continues flow through the interior of the FT shell 436 on the shell side to maintain the FT reactor 430 at the pre-determined activation temperature. The "process in feed" 429 may be allowed to continue to enter the FT reactor 430 as described above for a pre-determined time period. In alternate embodiments, the FT catalyst may be monitored to determine its level of activation and the timing of the procedure may be adjusted accordingly.

Similarly, during a regeneration procedure, the FT reactor 430 of FIG. 4, is heated, preferably uniformly, to the predetermined regeneration temperature, the "process in feed" 429 of at least one regeneration gas, selected to regenerate the particular at least partially deactivated FT catalyst used, is introduced to the tops of plurality of FT catalyst-filled tubes 434 and passes through the plurality of FT catalyst-filled tubes 434 to the bottom of the FT catalyst-filled tubes 434 and out of the FT reactor 430 via the FT outlet 439. In alternate embodiments, the "process in feed" may be fed into an FT inlet at the bottom of an FT reactor and the "process out output" exits through an FT outlet at the top of the FT reactor. The predetermined regeneration temperature may be achieved and maintained through use of the modulating valve 470 is coupled to a pressure controller 441 as described above, with or without the addition of the desuperheater 480. The HTF vapor 444 continues flow through the interior of the FT shell 436 on the shell side to maintain the FT reactor 430 at the pre-determined regeneration temperature. The "process in feed" 429 may be allowed to continue to enter the FT reactor 430 as described above for a pre-determined time period.

Just to give examples, a reduction step in an activation and/or regeneration process might in some cases require 48-72 hours, while an oxidation step in an activation and/or regeneration process might take about 170 hours. However, the pre-determined time period is specific to the FT catalyst being activated (or regenerated) and the particulars of the process being used to do so. The predetermined time period may also vary significantly between a single stage activation (or regeneration) process and a multi-stage activation (or regeneration) process.

In one or more alternate embodiments of the disclosure, a plurality of predetermined activation temperatures and/or activation gases may be used in a plurality stages, each having a stage duration that may be stage-specific, to activate the FT catalyst. In one or more alternate embodiments of the disclosure, a plurality of predetermined regeneration temperatures and/or regeneration gases may be used in a plurality stages, each having a stage duration that may be stage-specific, to regenerate the FT catalyst.

FIG. 5 depicts a diagram of a Fisher Tropsch tubular reactor 530 and heat transfer system 540 that includes a temperature controller 580, in accordance with one or more embodiments of the present disclosure. As with FIGS. 2-4, in FIG. 5, the heat transfer system 540 includes a heat transfer fluid (or HTF) vaporizer 542, an HTF vapor 544 passing via an HTF vapor flowline from the heat transfer fluid vaporizer 542 to the FT reactor 530, and a HTF liquid 546 passing via an HTF liquid flowline from the FT reactor 530 to the heat transfer fluid vaporizer 542. The FT reactor 530 includes an FT inlet 531, an FT reactor shell 532 and an FT outlet 539. The FT inlet 531 allows the passage of a "process in" feed 529 to enter the FT reactor 530 for processing. The FT outlet 539 allows a "process out" output 559 to exit the FT reactor 530.

Continuing to refer to FIG. 5, the FT reactor shell 532 preferably has a top and a bottom and includes an interior 536 and a plurality of FT catalyst-filled tubes 534 (each FT catalyst-filled tube having a top and a bottom) placed longitudinally and spaced within the interior 536. When the "process in feed" 529 enters the FT reactor 530 via the FT inlet 531, the "process in feed" 529 enters the plurality of FT catalyst-filled tubes 534 preferably through the tops of the FT catalyst-filled tubes 534 and passes through the plurality of FT catalyst-filled tubes 534 to the bottom of the catalyst-filled tubes 534 and out of the FT reactor via the FT outlet 539. In alternate embodiments, the "process in feed" may be fed into an FT inlet at the bottom of an FT reactor and the "process out output" exits through an FT outlet at the top of the FT reactor. The FT catalyst within the plurality of FT catalyst-filled tubes 534 is an FT catalyst that promotes conversion of syngas to liquid FT hydrocarbons. The FT reactor 530 also includes an HTF inlet 533 and an HTF outlet 535 that respectively permit an HTF vapor to enter and an HTF liquid to exit the interior 536 of the FT shell, outside of (i.e. on the shell side of) the plurality of FT catalyst-filled tubes 534. The temperature controller 580 monitors the temperature of the HTF vapor 542 in the HTF vapor flowline between the HTF vaporizer 542 and the HTF inlet 533. The temperature controller 580 may adjust an energy input to the HTF vaporizer 542. For example, if the temperature of the HTF vapor 542 drops by a predetermined temperature drop, the temperature controller 580 may increase the fuel or electricity 560 supplied to the HTF vaporizer 542. If the temperature of the HTF vapor 542 increases by a predetermined temperature increase, the temperature controller 580 may decrease or cut the fuel or electricity 560 supplied to the HTF vaporizer 542.

If the FT reactor 530 were in operation performing FT synthesis, with activated FT catalysts within the plurality of FT catalyst-filled tubes 534, the "process in" feed 529 would comprise syngas, which may be conditioned syngas and the process out" output 559 would comprise liquid FT hydrocarbons, FT water and an FT tail gas that exit the FT reactor 530 via the FT outlet 539. However, during FT catalyst activation, the "process in" feed 529 comprises one or more activation gases used to activate the non-activated FT catalysts. The one or more activation gases may vary depending upon the specific FT catalyst used. During FT catalyst activation operation, the "process out" output 559 comprises one or more result gases that result from the interaction of the one or more activation gases with the FT catalysts. Similarly, during FT catalyst regeneration, the "process in" feed 529 comprises one or more regeneration gases used to regenerate the at least partially deactivated FT catalysts. The one or more regeneration gases may vary depending upon the specific FT catalyst used. The "process out" output 559 during regeneration comprises one or more result gases that result from the interaction of the one or more regeneration gases with the FT catalysts.

During an activation procedure, once the FT reactor 530 of FIG. 5, is heated, preferably uniformly, to the predetermined activation temperature, the "process in feed" 529 of the at least one activation gas, selected to activate the particular at least partially non-activated FT catalyst used, is introduced to the tops of plurality of FT catalyst-filled tubes 534 and passes through the plurality of FT catalyst-filled tubes 534 to the bottom of the FT catalyst-filled tubes 534 and out of the FT reactor 530 via the FT outlet 539. The predetermined activation temperature is achieved and maintained through use of the temperature controller 580 to adjust an energy input to the HTF vaporizer 542, as described above. The HTF vapor 544 continues flow through the interior of the FT shell 536 on the shell side to maintain the FT reactor 530 at the pre-determined activation temperature. The "process in feed" 529 is allowed to continue to enter the FT reactor 530 as described above for a pre-determined time period.

Similarly, during a regeneration procedure, once the FT reactor 530 of FIG. 5, is heated, preferably uniformly, to the predetermined regeneration temperature, the "process in feed" 529 of the at least one regeneration gas, selected to regenerate the particular at least partially deactivated FT catalyst used, is introduced to the tops of plurality of FT catalyst-filled tubes 534 and passes through the plurality of FT catalyst-filled tubes 534 to the bottom of the FT catalyst-filled tubes 534 and out of the FT reactor 530 via the FT outlet 539. The predetermined regeneration temperature is achieved and maintained through use of the temperature controller 580 to adjust an energy input to the HTF vaporizer 542, as described above. The HTF vapor 544 continues flow through the interior of the FT shell 536 on the shell side to maintain the FT reactor 530 at the pre-determined regeneration temperature. The "process in feed" 529 is allowed to continue to enter the FT reactor 530 as described above for a pre-determined time period.

Just to give examples, a reduction step in an activation and/or regeneration process might in some cases require 48-72 hours, while an oxidation step in an activation and/or regeneration process might take about 170 hours. However, the pre-determined time period is specific to the FT catalyst being activated (or regenerated) and the particulars of the process being used to do so. The predetermined time period may also vary significantly between a single stage activation (or regeneration) process and a multi-stage activation (or regeneration) process. In alternate embodiments, the FT catalyst may be monitored to determine its level of activation and the timing of the procedure may be adjusted accordingly.

In one or more alternate embodiments of the disclosure, a plurality of predetermined activation temperatures and/or activation gases may be used in a plurality stages, each having a stage duration that may be stage-specific, to activate the FT catalyst. In one or more alternate embodiments of the disclosure, a plurality of predetermined regeneration temperatures and/or regeneration gases may be used in a plurality stages, each having a stage duration that may be stage-specific, to regenerate the FT catalyst.

Figure 6:
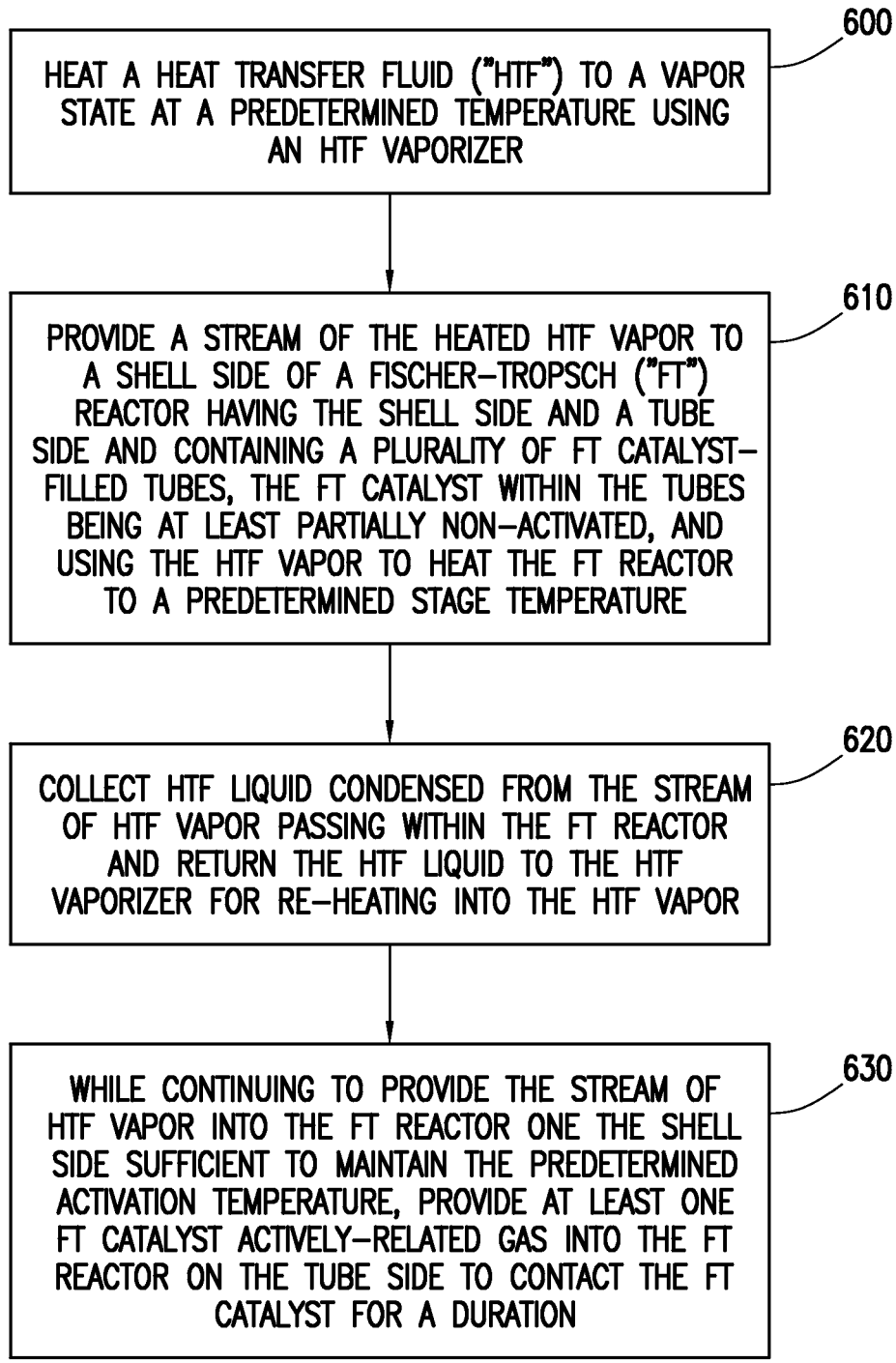
FIG. 6 is a flowchart for activating an FT catalyst in accordance with one or more embodiments of the present disclosure.

FIG. 6 is a flowchart for activating an FT catalyst in accordance with one or more embodiments of the present disclosure. A heat transfer fluid ("HTF") vaporizer heats 600 an HTF to a vapor state at a predetermined temperature. In step 610, the heated HTF vapor is provided to a shell side of a Fischer-Tropsch ("FT") reactor having the shell side and a tube side. The FT reactor also contains a plurality of FT catalyst-filled tubes. The FT catalyst in the FT catalyst-filled tubes is at least partially non-active. The heated HTF is used to heat the FT reactor to a predetermined activation temperature. As the HTF vapor passes through the FT reactor, the HTF vapor cools and condenses into an HTF liquid. In step 620, the HTF liquid is collected and returned to the HTF vaporizer for re-heating into the HTF vapor. In step 630, while continuing to provide the HTF vapor into the FT reactor on the shell side sufficient to maintain the predetermined activation temperature, at least one FT catalyst activity-related gas is provided into the FT reactor on the tube side to contact the FT catalyst in the FT catalyst-filled tubes for a duration.

While FIG. 6 specifically depicts a process for activation, a similar staged process could also be used for regeneration.

The duration may be pre-determined. The duration may be sufficient to at least partially activate or otherwise affect the activity of the FT catalyst. The at least one FT catalyst activity-related gas may be an activation gas or a regeneration gas. The at least one FT catalyst activity-related gas may perform reduction, oxidation or may be inert. As for the length of the duration, to give a few examples, a typical reduction step in an activation and/or regeneration process might in some cases require 48-72 hours, while an oxidation step in an activation and/or regeneration process might take about 170 hours. However, the pre-determined duration is specific to the FT catalyst being activated (or regenerated) and the particulars of the process being used to do so. The duration may also vary significantly between a single stage activation (or regeneration) process and a multi-stage activation (or regeneration) process.

In one or more alternate embodiments of the disclosure, a plurality of predetermined activation temperatures and/or activation gases may be used in a plurality stages, each having a stage duration that may be stage-specific, to activate the FT catalyst. In one or more alternate embodiments of the disclosure, a plurality of predetermined regeneration temperatures and/or regeneration gases may be used in a plurality stages, each having a stage duration that may be stage-specific, to regenerate the FT catalyst.

Figure 7:
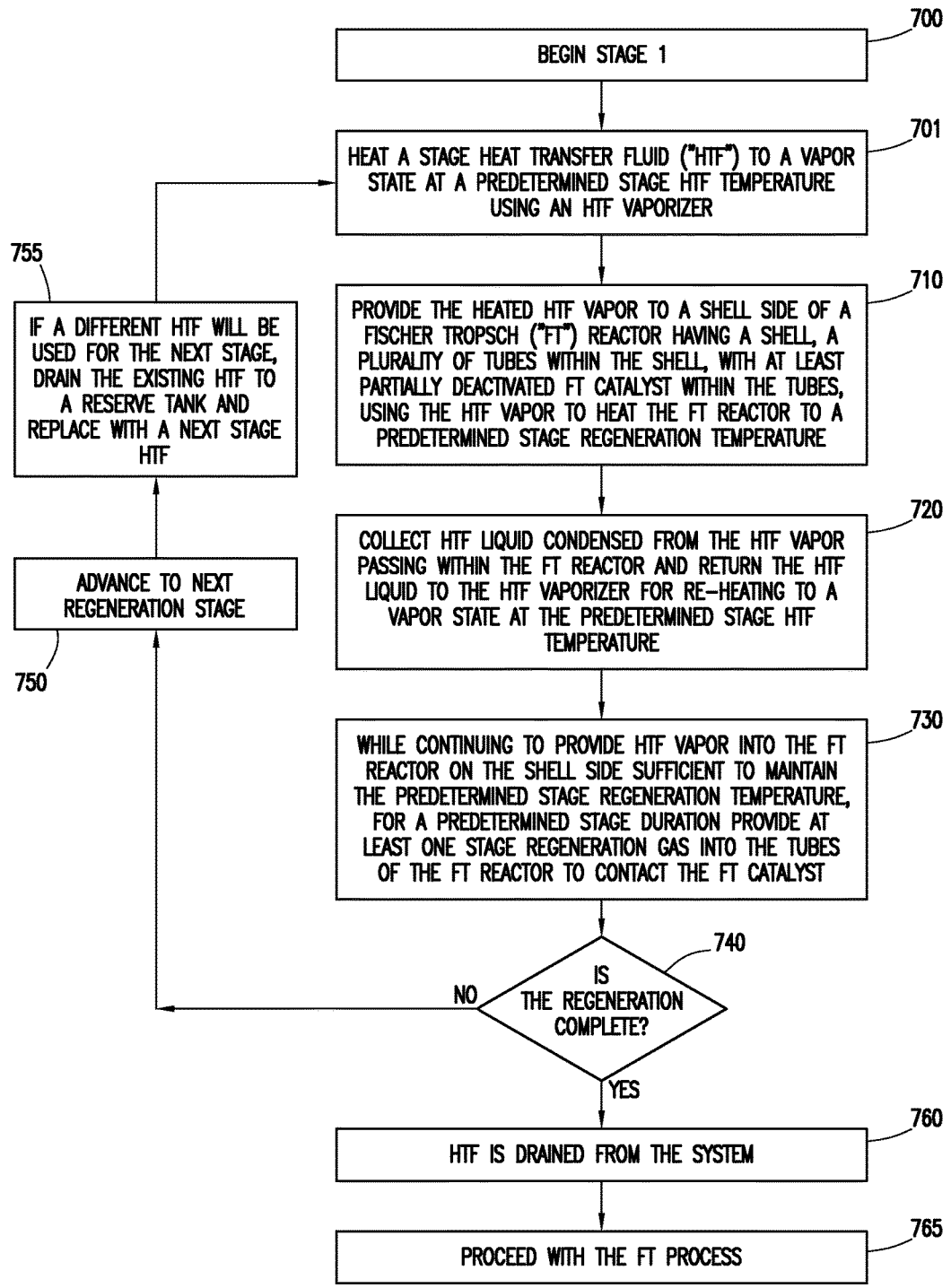
FIG. 7 is a flowchart for regenerating an at least partially deactivated FT catalyst in accordance with one or more embodiments of the present disclosure.

FIG. 7 is a flowchart for regenerating an at least partially deactivated FT catalyst in accordance with one or more embodiments of the present disclosure. A heat transfer fluid ("HTF") vaporizer heats 700 an HTF to a vapor state at a predetermined temperature. In step 710, the heated HTF vapor is provided to a shell side of a Fischer Tropsch ("FT") reactor to heat the FT reactor to a predetermined stage regeneration temperature. The FT reactor also contains a plurality of FT catalyst-filled tubes and has the shell side and a tube side. The FT catalyst in the FT catalyst-filled tubes has been at least partially deactivated through use. In step 720, HTF liquid condensed from the HTF vapor passing within shell side of the FT reactor is collected and returned to the HTF vaporizer for re-heating to a vapor state at the predetermined stage HTF temperature. In step 730, while continuing to provide HTF vapor into the FT reactor on the shell side sufficient to maintain the predetermined stage regeneration temperature, for a predetermined stage duration at least one stage regeneration gas is provided into the FT reactor on the tube side to contact the at least partially deactivated FT catalyst. After the predetermined stage duration, if the regeneration is not complete 740, the process advances 750 to the next regeneration stage. If a new HTF is to be used in the next stage, the HTF may be drained 755 to a reserve tank and replaced with the next stage HTF. In some cases, the same HTF may be used for all stages. However, in other cases, there may be reasons to select different HTF's for different stages. For example, the regeneration gases used in different stages may have different temperature and/or pressure requirements, for which different HTF's may be best suited. Steps 701, 710, 720 and 730 are repeated, typically for a predetermined number of stages sufficient to at least partially regenerate the at least partially deactivated FT catalyst. Each stage has its predetermined stage HTF temperature to which the HTF vapor is heated, its predetermined stage regeneration temperature to which the FT reactor is heated, its own at least one stage regeneration gas for contacting the FT catalyst and its own predetermined stage duration, during which the at least one stage regeneration gas is provided to contact the FT catalyst. The stage HTF temperature and the stage FT reactor temperature are based on the requirements of the regeneration gas (or gases) used for the stage. Preferably, the FT catalyst is fully regenerated when generation is complete. When regeneration is complete 740, the HTF may be drained 760 from the FT reactor and the FT process may be re-started 765.

While FIG. 7 specifically depicts a staged process for regeneration, a similar staged process could also be used for activation.

While the description herein has focused on use of the disclosed systems, apparatuses and methods for in situ activation or regeneration in an FT reactor, it is also feasible to perform activation (or regeneration) in an activation (or regeneration) vessel other than an FT reactor.

While some preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims that follow, that scope including all equivalents of the subject matter of the claims. Each and every claim is incorporated into the specification as an embodiment of the present invention. Thus, the claims are a further description and are an addition to the preferred embodiments of the present invention. The inclusion or discussion of a reference is not an admission that it is prior art to the present invention, especially any reference that may have a publication date after the priority date of this application. The disclosures of all patents, patent applications, and publications cited herein are hereby incorporated by reference, to the extent that they provide background knowledge; or exemplary, procedural or other details supplementary to those set forth herein.

What is claimed is:

1. A method of increasing the activity level of a Fischer-Tropsch ("FT") catalyst in situ, comprising:
    a. heating a heat transfer fluid ("HTF") to a vapor state at a predetermined HTF temperature using an HTF vaporizer to create an HTF vapor;
    b. providing a stream of the HTF vapor to an HTF input of a shell side of an FT reactor, having the shell side and a tube side, to heat the FT reactor to a predetermined reactor temperature, the FT reactor containing an at least partially non-active FT catalyst in a plurality of FT catalyst-filled tubes, the vaporous HTF cooling and at least partially condensing to a liquid HTF;
    c. passing the liquid HTF through an HTF output of the shell side of the FT reactor;
    d. returning the liquid HTF to the HTF vaporizer for re-heating into the vaporous HTF; and
    e. while continuing to provide the stream of HTF vapor into the FT reactor on the shell side sufficient to maintain the predetermined reactor temperature, providing at least one FT catalyst activity-related gas into the FT reactor on the tube side to contact the at least partially non-active FT catalyst.

2. The method of claim 1, wherein the step of providing the at least one FT catalyst activity-related gas into the FT reactor on the tube side to contact the at least partially non-active FT catalyst continues until the activity level of the FT catalyst reaches a desired state.

3. The method of claim 1, wherein the step of providing the at least one FT catalyst activity-related gas into the FT reactor on the tube side to contact the at least partially non-active FT catalyst continues for a predetermined duration.

4. The method of claim 1, wherein the at least one FT catalyst activity-related gas comprises an activation gas.

5. The method of claim 1, wherein the at least one FT catalyst activity-related gas comprises a regeneration gas.

6. The method of claim 1, wherein the HTF comprises an organic compound.

7. The method of claim 1, wherein the HTF comprises an oil.

8. The method of claim 4, wherein the FT catalyst in the FT catalyst-filled tubes in step (b) is in an un-activated state.

9. The method of claim 4, wherein the FT catalyst in the FT catalyst-filled tubes in step (b) is in a partially activated state.

10. The method of claim 5, wherein the FT catalyst in the FT catalyst-filled tubes in step (b) is in at least a partially de-activated state.

11. The method of claim 1, wherein the HTF vapor passes from the HTF vaporizer to the FT reactor via an HTF vapor flowline and a pressure controller monitors the pressure of the HTF vapor in the HTF vapor flowline and controls the temperature of the HTF vapor by signaling a programmable logic controller ("PLC") which controls energy provided to the HTF vaporizer.

12. The method of claim 1, wherein the HTF vapor passes from the HTF vaporizer to the FT reactor via an HTF vapor flowline and a pressure controller monitors the pressure of the HTF vapor in the HTF vapor flowline and signals a modulating valve to adjust its opening to control the temperature of the HTF vapor.

13. The method of claim 1, wherein the HTF vapor passes from the HTF vaporizer to the FT reactor via an HTF vapor flowline and a temperature controller monitors the temperature of the HTF vapor in the HTF vapor flowline and adjusts energy provided to the HTF vaporizer to control the temperature of the HTF vapor.

14. A method of increasing the activity level in situ of an at least partially non-active Fischer-Tropsch ("FT") catalyst, comprising:
   a. heating a heat transfer fluid ("HTF") to a vapor state at a predetermined stage HTF temperature using an HTF vaporizer;
   b. providing a stream of the heated HTF vapor to an input of a shell side of an FT reactor to heat the FT reactor to a predetermined stage temperature, the FT reactor having the shell side and a tube side, the tube side comprising a plurality of tubes containing the at least partially non-active FT catalyst;
   c. passing a stream of HTF liquid, which has condensed from the HTF vapor as the HTF vapor passes through the FT reactor on the shell side, through an output of the shell side and returning the stream of HTF liquid to the HTF vaporizer for reheating into the HTF vapor;
   d. while continuing to provide the stream of HTF vapor into the FT reactor on the shell side sufficient to maintain the predetermined stage temperature, providing at least one stage FT catalyst activity-related gas into the FT reactor on the tube side to contact the at least partially non-active FT catalyst; and
   e. repeating steps (a)-(d) for a predetermined number of stages sufficient to at least partially regenerate the at least partially non-active FT catalyst, wherein each stage has its own predetermined stage HTF temperature to which the HTF vapor is heated, its own predetermined stage temperature to which the FT reactor is heated, its own stage FT catalyst activity-related gas for contacting the FT catalyst and its own stage duration, during which the at least one stage FT catalyst activity-related gas is provided to contact the FT catalyst.

15. The method of claim 14, wherein at least one of the stage durations continues until the activity level of the FT catalyst reaches a desired state.

16. The method of claim 14, wherein at least one of the stage durations continues for a predetermined duration period.

17. The method of claim 14, wherein the at least one stage FT catalyst activity-related gas comprises an activation gas.

18. The method of claim 14, wherein the at least one stage FT catalyst activity-related gas comprises a regeneration gas.

19. The method of claim 14, wherein the HTF comprises an organic compound.

20. The method of claim 14, wherein the HTF comprises an oil.

21. The method of claim 17, wherein the FT catalyst in the FT catalyst-filled tubes in step (b) is in an un-activated state.

22. The method of claim 17, wherein the FT catalyst in the FT catalyst-filled tubes in step (b) is in a partially activated state.

23. The method of claim 18, wherein the FT catalyst in the FT catalyst-filled tubes in step (b) is in at least a partially de-activated state.

24. The method of claim 14, wherein the HTF vapor passes from the HTF vaporizer to the FT reactor via an HTF vapor flowline and a pressure controller monitors the pressure of the HTF vapor in the HTF vapor flowline and controls the temperature of the HTF vapor by signaling a programmable logic controller ("PLC") which controls energy provided to the HTF vaporizer.

25. The method of claim 14, wherein the HTF vapor passes from the HTF vaporizer to the FT reactor via an HTF vapor flowline and a pressure controller monitors the pressure of the HTF vapor in the HTF vapor flowline and signals a modulating valve to adjust its opening to control the temperature of the HTF vapor.

26. The method of claim 14, wherein the HTF vapor passes from the HTF vaporizer to the FT reactor via an HTF vapor flowline and a temperature controller monitors the temperature of the HTF vapor in the HTF vapor flowline and adjusts energy provided to the HTF vaporizer to control the temperature of the HTF vapor.

27. A method of improving the activity of an at least partially non-active Fischer-Tropsch ("FT") catalyst in situ in a tubular FT reactor, comprising:
   a. heating a heat transfer fluid ("HTF") to a vapor state;
   b. providing a shell side of the tubular FT reactor with the heated HTF in the vapor state to achieve and maintain the at least partially non-active FT catalyst at a predetermined stage temperature; and
   c. exposing the at least partially non-active FT catalyst to at least one stage FT catalyst activity-related gas, by passage of the at least one stage FT catalyst activity-related gas through tubes of the tubular FT reactor, for a stage duration.

28. The method of claim 27, wherein the step of exposing the at least partially non-active FT catalyst to at least one stage FT catalyst activity-related gas continues until the activity level of the FT catalyst reaches a desired state.

29. The method of claim 27, wherein the stage duration has a predetermined length.

30. The method of claim 27, wherein the at least one stage FT catalyst activity-related gas comprises an activation gas.

31. The method of claim 27, wherein the wherein the at least one stage FT catalyst activity-related gas comprises a regeneration gas.

32. The method of claim 27, wherein the HTF comprises an organic compound.

33. The method of claim 27, wherein the HTF comprises an oil.

34. A system for increasing the activity of a Fischer-Tropsch ("FT") catalyst, comprising:
   a. a heat transfer fluid ("HTF") vaporizer for heating a heat transfer fluid ("HTF") to a vapor state;
   b. an FT reactor containing a plurality of FT catalyst-filled tubes and having a shell side and a tube side, wherein the FT catalyst in the FT catalyst-filled tubes is at least partially non-active;
   c. the FT reactor further comprising an HTF inlet on the shell side, an HTF outlet on the shell side, a process inlet on the tube side and a process outlet on the tube side, the HTF outlet permitting passage out of the FT reactor of an HTF liquid that has condensed from the HTF vapor as the HTF vapor passes through the FT reactor on the shell side, and the process inlet and the process outlet allowing passage of at least one FT catalyst activity-related gas through the FT reactor on the tube side to contact the at least partially non-active FT catalyst;

d. a HTF vapor flowline for providing the heated HTF vapor to the shell side of the FT reactor via the HTF inlet to permit the HTF vapor to heat the FT reactor to a predetermined activation temperature and to maintain the FT reactor at the predetermined activation temperature for a stage duration; and e. a HTF liquid flowline to transport the HTF liquid from the HTF outlet to the HTF vaporizer for re-heating into the HTF vapor.

35. The system of claim 34, wherein the at least partially non-active FT catalyst is in at least a partially non-activated state and the at least one FT catalyst activity-related gas comprises an activation gas.

36. The system of claim 34, wherein the at least partially non-active FT catalyst is in at least a partially de-activated state and the at least one FT catalyst activity-related gas comprises a regeneration gas.

37. The system of claim 34, wherein the HTF comprises an organic compound.

38. The system of claim 34, wherein the HTF comprises an oil.

39. The system of claim 34, further comprising a pressure controller configured to monitor the pressure of the HTF vapor in the HTF vapor flowline and a programmable logic controller ("PLC"), wherein the pressure controller controls the temperature of the HTF vapor, responsive to the monitored pressure, by signaling the PLC, which controls energy provided to the HTF vaporizer.

40. The system of claim 34, further comprising a pressure controller configured to monitor the pressure of the HTF vapor in the HTF vapor flowline and a modulating valve positioned on the HTF vapor flowline between the HTF vaporizer and the FT reactor, wherein the pressure controller controls the temperature of the HTF vapor, responsive to the monitored pressure, by signaling the modulating valve to adjust its opening to permit passage of more or less HTF vapor.

41. The system of claim 34, further comprising a temperature controller that monitors the temperature of the HTF vapor in the HTF vapor flowline and adjusts energy provided to the HTF vaporizer to control the temperature of the HTF vapor.

42. An apparatus for providing a vaporous heat transfer fluid ("HTF") to provide a pre-determined temperature for a process of increasing the activity of a Fischer-Tropsch ("FT") catalyst, comprising:

a. a heat transfer fluid ("HTF") vaporizer for heating the HTF to a vapor state at a predetermined temperature, the HTF vaporizer having an HTF liquid inlet and an HTF vapor outlet;

b. an HTF vapor flowline for connecting the HTF vapor outlet to an input of a shell side of a tubular FT reactor; and c. an HTF liquid flowline for connecting an output of the shell side of the tubular FT reactor to the HTF liquid inlet.

43. The apparatus of claim 42, wherein the HTF comprises an organic compound.

44. The apparatus of claim 42, wherein the HTF comprises an oil.

45. The apparatus of claim 42, further comprising a pressure controller configured to monitor the pressure of the HTF vapor in the HTF vapor flowline and a programmable logic controller ("PLC"), wherein the pressure controller controls the temperature of the HTF vapor, responsive to the monitored pressure, by signaling the PLC, which is configured to control energy provided to the HTF vaporizer.

46. The apparatus of claim 42, further comprising a pressure controller configured to monitor the pressure of the HTF vapor in the HTF vapor flowline and a modulating valve positioned on the HTF vapor flowline between the HTF vaporizer and the FT reactor, wherein the pressure controller controls the temperature of the HTF vapor, responsive to the monitored pressure, by signaling the modulating valve to adjust its opening to permit passage of more or less HTF vapor.

47. The apparatus of claim 42, further comprising a temperature controller that monitors the temperature of the HTF vapor in the HTF vapor flowline and adjusts energy provided to the HTF vaporizer to control the temperature of the HTF vapor.

* * * * *